US010732901B2

(12) United States Patent
Matsugami et al.

(10) Patent No.: US 10,732,901 B2
(45) Date of Patent: Aug. 4, 2020

(54) STORAGE SYSTEM AND STORAGE CONTROL METHOD

(71) Applicant: HITACHI, LTD., Tokyo (JP)

(72) Inventors: Kazuki Matsugami, Tokyo (JP); Tomohiro Kawaguchi, Tokyo (JP); Yoshihiro Yoshii, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 16/331,776

(22) PCT Filed: Jun. 30, 2017

(86) PCT No.: PCT/JP2017/024147
§ 371 (c)(1),
(2) Date: Mar. 8, 2019

(87) PCT Pub. No.: WO2019/003416
PCT Pub. Date: Jan. 3, 2019

(65) Prior Publication Data
US 2019/0278521 A1    Sep. 12, 2019

(51) Int. Cl.
*G06F 3/06* (2006.01)
*G06F 12/00* (2006.01)

(52) U.S. Cl.
CPC .............. *G06F 3/0659* (2013.01); *G06F 3/06* (2013.01); *G06F 3/0604* (2013.01); *G06F 3/065* (2013.01);
(Continued)

(58) Field of Classification Search
CPC ........ G06F 3/06; G06F 3/0659; G06F 3/0604; G06F 3/0631; G06F 3/065; G06F 3/067; G06F 12/00; G06F 13/00
(Continued)

(56) References Cited

U.S. PATENT DOCUMENTS 6,434,681 B1 *  8/2002  Armangau .......... G06F 11/1466
                                                    711/162
6,584,554 B1 *  6/2003  Dahlen ................ G06F 3/0601
                                                    711/130
(Continued)

FOREIGN PATENT DOCUMENTS

WO    2015/162663 A1   10/2015
WO    2015/189925 A1   12/2015
WO    2017/064770 A1    4/2017

*Primary Examiner* — Tuan V Thai
(74) *Attorney, Agent, or Firm* — Volpe and Koenig, P.C.

(57) ABSTRACT

Each of a storage apparatus having a primary volume and a storage apparatus having a secondary volume, upon reception of a write command, changes a data attribute of a data area allocated to an address designated by the write command, to a first attribute if the data attribute is other than the first attribute. In an offloaded data copy processing sequence, each of the storage apparatus changes a data attribute of a data area allocated to a copy source address to a second attribute if the data attribute is other than the second attribute. When an allocation information copy process is to be performed to allocate the data area to a copy destination address according to an offloaded data copy command, each of the storage apparatus discontinues the offloaded data copy processing sequence if the data attribute of the data area is the first attribute.

10 Claims, 11 Drawing Sheets

(52) U.S. Cl.
CPC ............ *G06F 3/067* (2013.01); *G06F 3/0631* (2013.01); *G06F 12/00* (2013.01)

(58) Field of Classification Search
USPC .......................... 711/100, 154, 165, 166, 200
See application file for complete search history.

(56) References Cited

U.S. PATENT DOCUMENTS

| | | | |
|---|---|---|---|
| 6,594,667 B2 * | 7/2003 | Dahlen | .................. G06F 16/22 |
| 8,074,035 B1 * | 12/2011 | Per | ..................... G06F 11/1451 |
| | | | 707/610 |
| 8,850,145 B1 * | 9/2014 | Haase | ................ G06F 11/1435 |
| | | | 711/162 |
| 2009/0271582 A1 | 10/2009 | Ninose | |
| 2014/0380006 A1 * | 12/2014 | Maeda | ................ G06F 3/0683 |
| | | | 711/162 |
| 2015/0012704 A1 | 1/2015 | Watanabe et al. | |
| 2015/0135004 A1 * | 5/2015 | Kobashi | ................ G06F 3/067 |
| | | | 714/6.3 |

\* cited by examiner

FIG. 4

VOLUME MANAGEMENT TABLE
205

| VOL ID (41) | VOL ATTRIBUTE (42) | ALLOCATION COPY FLAG (43) | VOL CAPACITY (44) | POOL ID (45) |
|---|---|---|---|---|
| 0 | THIN PROVISIONING | YES | 100GB | 0 |
| 10 | DEDUPLICATION EFFECTIVE | YES | 200GB | 0 |
| 20 | NORMAL VOL | NO | 500GB | 1 |
| ... | ... | ... | ... | ... |

FIG. 5

POOL CONFIGURATION MANAGEMENT TABLE
206

| POOL ID (51) | RAID GROUP ID (52) | POOL CAPACITY (53) | POOL USAGE CAPACITY (54) |
|---|---|---|---|
| 0 | 0<br>1 | 10TB | 5TB |
| ... | ... | ... | ... |

FIG. 6

RAID CONFIGURATION MANAGEMENT TABLE
207

| RAID GROUP ID (61) | DRIVE ID (62) | DRIVE TYPE (63) | CAPACITY (64) | USED CAPACITY (65) |
|---|---|---|---|---|
| 0 | 0<br>1 | FMD | 10TB | 5TB |
| ... | ... | ... | ... | ... |

FIG. 7

POOL ALLOCATION MANAGEMENT TABLE
208

| VOL ID (71) | VOL ADDRESS (72) | POOL ID (73) | POOL ADDRESS (74) | DATA ATTRIBUTE (75) |
|---|---|---|---|---|
| 0 | 100 | 0 | 10 | INDIVIDUAL |
| 0 | 200 | 0 | 10000 | COMMON |
| ... | ... | ... | ... | ... |

FIG. 8

DRIVE ALLOCATION MANAGEMENT TABLE
209

| POOL ID (81) | POOL ADDRESS (82) | RAID GROUP ID (83) | DRIVE ID (84) | DRIVE ADDRESS (85) |
|---|---|---|---|---|
| 0 | 10 | 0 | 0 | 100 |
| 0 | 10000 | 1 | 5 | 1000 |
| ... | ... | ... | ... | ... |

FIG. 9

ACTUAL DRIVE ALLOCATION MANAGEMENT TABLE
210

| DRIVE ID (91) | DRIVE ADDRESS (92) | PRE-COMPRESSION SIZE (93) | ACTUAL DRIVE ID (94) | ACTUAL DRIVE ADDRESS (95) | POST-COMPRESSION SIZE (96) | COMPRESSION RATIO (97) |
|---|---|---|---|---|---|---|
| 0 | 100 | 42MB | 0 | 50 | 21MB | 1/2 |
| 5 | 1000 | 42MB | 5 | 500 | 10.5MB | 1/4 |
| ... | ... | ... | ... | ... | ... | ... |

HA PAIR MANAGEMENT TABLE
211

| STORAGE CONTROLLER ID | VOL ID | HA PAIR ATTRIBUTE | COMPANION ID | VIRTUAL ID |
|---|---|---|---|---|
| 0 | 0 | PVOL | 10001 | 001 |
| 10001 | 10 | SVOL | 0 | 001 |
| 0 | 40 | NO | - | - |
| ... | ... | ... | ... | ... |

STORAGE SYSTEM AND STORAGE CONTROL METHOD

TECHNICAL FIELD

The present invention relates to a storage system.

BACKGROUND ART

Storage systems generally have one or more storage apparatus. Each of the storage apparatus has an HDD (Hard Disk Drive) or an SSD (Solid State Drive) as a storage device. A storage system is accessible by one or more host apparatus, e.g., a host computer, via a network such as a SAN (Storage Area Network) or a LAN (Local Area Network). Generally, storage apparatus are rendered highly reliable by a reliability enhancing process according to the RAID (Redundant Array of Independent (or Inexpensive) Disks) technology.

Patent Document 1 discloses an information system that is capable of improving availability. According to Patent Document 1, a first volume of a first storage apparatus and a second volume of a second storage apparatus are provided as identical volumes to a host computer. The host computer recognizes the first volume and the second volume as identical volumes with different buses.

Patent Document 2 discloses an HA (High Availability) pair configuration in which a first volume of a first storage apparatus and a second volume of a second storage apparatus respond to a host computer with identical virtual IDs. According to Patent Document 2, when the first storage apparatus and the second storage apparatus receive an offloaded data copy command indicating the virtual ID as a copy destination from the host computer, the first storage apparatus and the second storage apparatus select either the first volume or the second volume as a copy source volume depending on the storage apparatus where the copy destination volume exists, and copy data from the selected copy source volume to the copy destination volume.

PRIOR ART DOCUMENT

Patent Documents

Patent Document 1: US-2009/0271582-A1
Patent Document 2: WO-2015/189925-A1

SUMMARY OF THE INVENTION

Problem to be Solved by the Invention

An offloaded data copy process causes data transfer to take place between the volumes or the storage apparatus. In such a case, the processing rate for the offloaded data copy is limited by the bandwidth of the data transfer.

One process of increasing the processing rate would be to transfer, instead of data to be copied per se, information indicating the data storage location in the storage apparatus, i.e., allocation information. However, transferring allocation information to volumes coupled in an HA pair configuration may possibly result in an inconsistency or mismatch of data between the HA pair on account of a data update passing unnoticed from the host computer.

The above problem may occur not only in storage systems having an HA pair configuration, but also in storage systems in which two or more different volumes in two or more different storage apparatus are provided as identical volumes to a host computer.

Means for Solving the Problem

A storage system has a plurality of storage apparatus connected to a host computer. Either one of the storage apparatus functions as a first storage apparatus having a primary volume, which is paired with a secondary volume. Either one of the storage apparatus functions as a second storage apparatus having the secondary volume. Each of the primary volume and the secondary volume is updatable. Each of the first storage apparatus and the second storage apparatus, upon reception of a write command, changes a data attribute of a data area allocated to an address designated by the write command, to a first attribute if the data attribute is other than the first attribute. In an offloaded data copy processing sequence performed when the first storage apparatus or the second storage apparatus receives an offloaded data copy command from the host computer, each of the first storage apparatus and the second storage apparatus (A) changes a data attribute of a data area allocated to a copy source address according to the offloaded data copy command, to a second attribute if the data attribute is other than the second attribute, and (B) when an allocation information copy process is to be performed to allocate the data area to a copy destination address according to the offloaded data copy command, performs the allocation information copy process if the data attribute of the data area is the second attribute, and discontinues the offloaded data copy processing sequence, e.g., redoes the offloaded data copy processing sequence as described later, if the data attribute of the data area is the first attribute.

Effect of the Invention

Since copy target data do not need to be transferred themselves, the copy processing time of the offloaded data copy processing sequence is reduced. As the data attributes of the data areas are managed and, if data are updated before the allocation information copy process, such a data update is detected, data consistency is maintained in the offloaded data copy processing sequence that does not require copy target data to be transferred themselves.

BRIEF DESCRIPTION OF THE DRAWINGS

FIG. 4 is a diagram illustrating a configurational example of a VOL (Volume) management table.

FIG. 5 is a diagram illustrating a configurational example of a pool configuration management table.

FIG. 6 is a diagram illustrating a configurational example of a RAID configuration management table.

FIG. 7 is a diagram illustrating a configurational example of a pool allocation management table.

FIG. 8 is a diagram illustrating a configurational example of a drive allocation management table.

FIG. 9 is a diagram illustrating a configurational example of an actual drive allocation management table.

MODES FOR CARRYING OUT THE INVENTION

Figure 1:
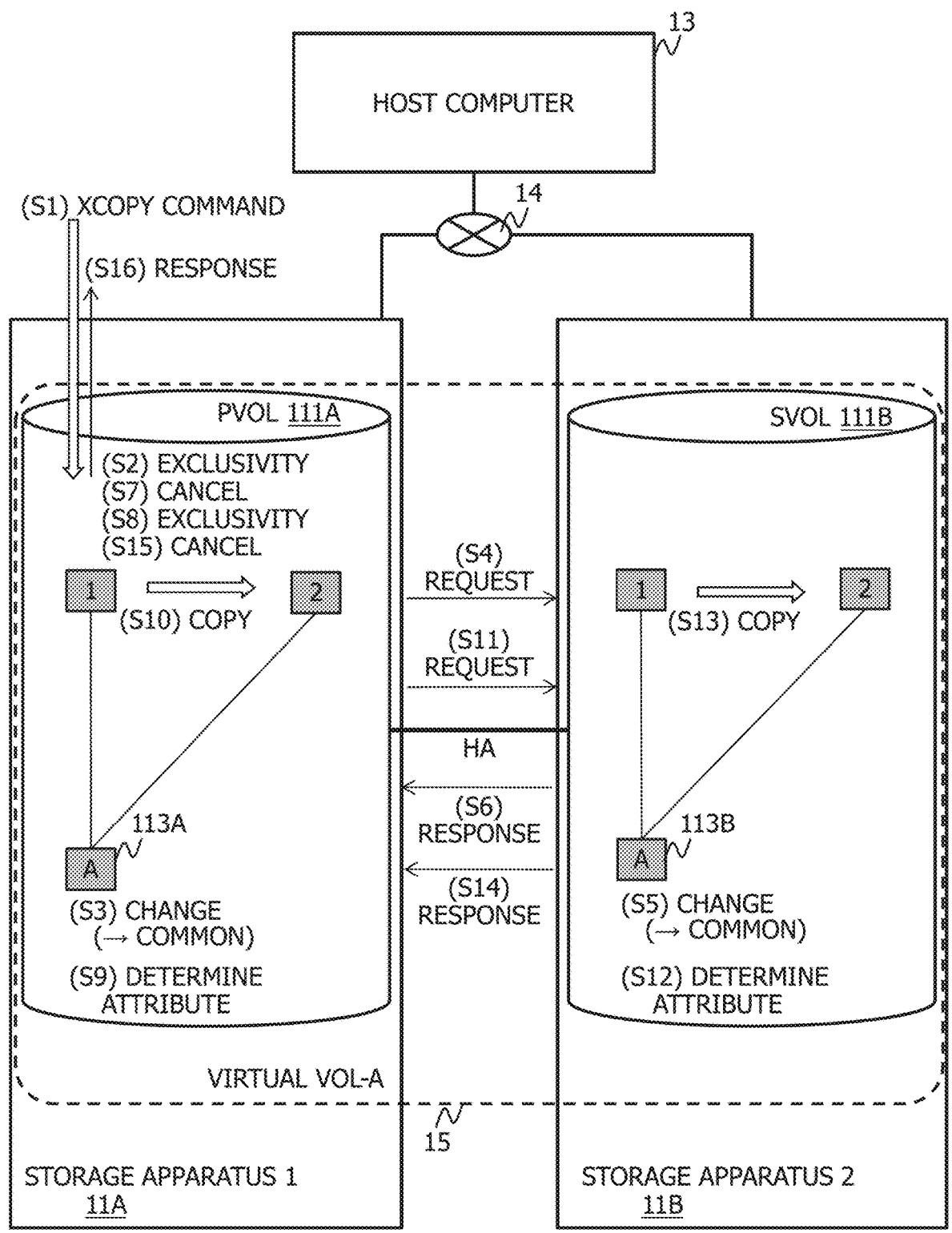
FIG. 1 is a diagram illustrating an offloaded data copy process in a storage system having an HA pair configuration.

In the description that follows, an "interface unit" may include at least one of a user interface unit and a communication interface unit. The user interface unit may include at least one I/O device of one or more I/O devices, e.g., an input device such as a keyboard and a pointing device, for example, and an output device such as a display device, for example, and a display computer. The communication interface unit may include one or more communication interface devices. The one or more communication interface devices may be one or more communication interface devices of one type, e.g., one or more NICs (Network Interface Cards), or two or more communication interface devices of different types, e.g., NIC and HBA (Host Bus Adapter).

In the description that follows, a "memory unit" includes one or more memories. At least one memory may be a volatile memory or a nonvolatile memory. The memory unit is mainly used in processing sequences carried out by a processor unit.

In the description that follows, a "processor unit" includes one or more processors. At least one processor is typically a CPU (Central Processing Unit). A processor may include a hardware circuit that carries out a processing sequence wholly or partly.

In the description that follows, information may be described by an expression like "xxx table," though it may be expressed as any data structure. In other words, in order to indicate that information is independent of a data structure, "xxx table" may be described as "xxx information." In the description that follows, the configuration of each table is given by way of example, and one table may be divided into two or more tables whereas two or more tables may be, wholly or partly, one table.

In the description that follows, where elements of one type are described indistinctively, a common character or characters of reference characters thereof are used, and where elements of one type are described distinctively, reference characters thereof or IDs, e.g., identification numbers, of the elements are used. For example, where storage apparatus are referred to indistinctively, they are addressed as "storage apparatus 11," and where storage apparatus are referred to distinctively, they are addressed as "storage apparatus 11A" and "storage apparatus 11B" or "storage apparatus 1" and "storage apparatus 2."

In the description that follows, a "storage system" includes one or more storage apparatus. At least one storage apparatus may be a general-purpose physical computer. Alternatively, at least one storage apparatus may be a virtual storage apparatus and may execute SDx (Software-Defined anything). SDx may employ, for example, SDS (Software-Defined Storage), which is an example of virtual storage apparatus, or SDDC (Software-Defined Data Center).

Embodiments will be described hereinafter with reference to the drawings.

Embodiment 1

First, Embodiment 1 will be described hereinafter.
<HA Pair Configuration>
FIG. 1 is a diagram illustrating an offloaded data copy process in a storage system having an HA pair configuration.

A storage system 100 that has an HA pair configuration has two or more storage apparatus 11 that are accessible by a host computer 13 via a network 14. In the example illustrated in FIG. 1A, the storage system 100 has storage apparatus 1 and 2. The storage system 100 is managed by a management computer, not illustrated. Each of the storage apparatus 11 has one or two volumes, i.e., logical storage areas. The host computer 13 may be a physical computer or a virtual computer executed by a physical computer. The host computer 13 may be a virtual computer executed in the storage system.

The storage system 100 provides two or more different volumes in the two or more different storage apparatus 11 as identical volumes to the host computer 13. Specifically, according to the HA configuration, for example, a PVOL (Primary Volume) 111P and an SVOL (Secondary Volume) 111S are provided as a single virtual VOL 15, e.g., a virtual VOL-A, to the host computer 13.

In the storage system 100 of the HA pair configuration, two volumes, i.e., a PVOL 111A and an SVOL 111B, replicate data in synchronism with each other. Both the PVOL 111A and the SVOL 111B are accessible by the host computer 13. In other words, the storage system 100 provides an active-active system where both volumes or VOLs, i.e., both storage apparatus 1 and 2, simultaneously take charge of I/O processing. With respect to either of the PVOL 111A and the SVOL 111B, each of the storage apparatus 1 and 2 sends one virtual ID, e.g., a virtual apparatus ID or a virtual VOL ID, in response to an inquiry command from the host computer 13. Consequently, the host computer 13 can access either of the PVOL 111A of the storage apparatus 1 and the SVOL 111B of the storage apparatus 2 by designating a virtual ID allocated to the VOLs of the HA pair configuration.

The host computer 13 accesses the PVOL 111A and the SVOL 111B with the same VOL ID "VOL-A."
<Offloaded Data Copy Process in HA Pair Configuration>
An offloaded data copy process refers to a process in which a copy process that should be carried out by the host computer 13 is performed by the storage apparatus 1 and the storage apparatus 2, rather than the host computer 13. The function of the offloaded data copy process makes it possible to perform the copy process without requiring the host computer 13 to input and output data to be copied. Consequently, it can be expected to reduce the amount of resources, e.g., CPUs and memories, used by the host computer 13 and the amount of communication between the host computer 13 and the storage apparatus 11.

FIG. 1A illustrates an example in which the host computer 13 sends an XCOPY command that is one of iSCSI commands to the storage apparatus 1. In FIG. 1A, an XCOPY command is employed as an example of offloaded data copy command, though an XCOPY command is not limited to an offloaded data copy command. For example, an XCOPY command may be an ODX command for offloading a copy process.

An offloaded data copy process carried out by the storage system 100 of the HA pair configuration in which the host computer 13 offloads a data copy process to the storage apparatus 1 and the storage apparatus 2 will be described below.

According to the present embodiment, each of the storage apparatus 1 and 2 manages attributes per data area in order to detect the occurrence of an update of data in response to a write command from the host computer 13. The attributes per data area include an attribute "common" indicating that no update has occurred and an attribute "individual" indicating that an update has occurred, though there may be other attributes than "common" and "individual."

When the storage apparatus 1 receives from the host computer 13 an XCOPY command specifying an address 1 of an allocation destination for a data area where data A are stored, the storage apparatus 1 sets the attribute of the data area 113A where the data A are stored to "common" indicating that no update has occurred. Then, the storage apparatus 1 copies the allocation information, whereupon the XCOPY process, i.e., an example of offloaded data copy process, is completed.

A specific example is given as follows:

(S1) The storage apparatus 1 receives an XCOPY command from the host computer 13 via the network 14. The XCOPY command includes an address 1 of an allocation destination for the data area 113A of the data A, i.e., a copy source address 1, and a copy destination address 2. Upon reception of the XCOPY command, an XCOPY process from S2 is started.

(S2) The storage apparatus 1 retains exclusivity of a slot indicated by the copy source address 1 of the PVOL 111A in response to the XCOPY command. The data A in the slot are now prevented from being updated by the host computer 13. The "slot" refers to an area in a VOL. "Retaining exclusivity of a slot" means a process of preventing data from being read from or written in a slot indicated by an address that is designated by a read command and a write command from the host computer 13. The storage apparatus 1 manages information that the host computer 13 refers to in recognizing that exclusivity is retained. The information may be of any type insofar as it can be identified, such as a bit map or time information. In the present embodiment, whereas a "slot" refers to an area in a VOL, e.g., a TP-VOL that is a VOL according to thin provisioning, a "data area" refers to an area allocated to a slot, e.g., a pool area that is an area in a pool.

(S3) The storage apparatus 1 changes the data attribute of the data area 113A, i.e., the data area where the data A are stored, allocated to the copy source address 1, to "common" if the data attribute has been other than "common," e.g., it has been "individual." After exclusivity has been retained in (S2), since the data attribute is changed in the storage apparatus 2 as described below in addition to the changing of the data attribute in the storage apparatus 1, the data attributes are unified into "common" in both of the storage apparatus 1 and 2.

(S4) The storage apparatus 1 sends a data attribute change request for changing the data attribute of a copy source address 1 of the SVOL 111B to the storage apparatus 2. An address n (n is a natural number) of the PVOL 111A may be the same as an address n of the SVOL 111B.

(S5) In response to the data attribute change request, the storage apparatus 2 changes the data attribute of the data area 113B, i.e., the data area where the data A are stored, allocated to the copy source address 1 of the SVOL 111B, to "common" if the data attribute has been other than "common," e.g., it has been "individual."

(S6) The storage apparatus 2 returns an attribute change completion response to the storage apparatus 1.

(S7) In response to the attribute change completion response, the storage apparatus 1 cancels the exclusivity of the slot indicated by the copy source address 1 of the PVOL 111A. Since the exclusivity of the copy source address 1 is canceled at this stage, the period during which the host computer 13 is prohibited from updating the data at the address 1 can be shortened.

(S8) The storage apparatus 1 retains exclusivity of a slot indicated by a copy destination address 2 of the PVOL 111A.

(S9) The storage apparatus 1 determines whether the data attribute of the data area 113A is "common" or not. If the determined result is false, i.e., if the data attribute is "individual," then the storage apparatus 1 interrupts the offloaded data copy process. Specifically, for example, the storage apparatus 1 resumes the sequence again from (S2). The storage apparatus 1 may resume the sequence from (S1) after returning an error to the host computer 13. Providing the storage apparatus 1 has received a write command designating the copy source address 1 of the PVOL after (S5), for example, the storage apparatus 1 changes the data attribute of the data area 113A to "individual" if the data attribute has been other than "individual," e.g., it has been "common." In this case, the determined result in (S9) is false.

(S10) If the determined result in (S9) is true, then the storage apparatus 1 copies allocation information from the copy source address 1 to the copy destination address 2, i.e., adds the copy destination address 2 as an allocation destination of the data area 113A. Thus, it is possible to read or update the data A via the copy destination address 2. Since the allocation information is copied while the exclusivity is retained for the copy destination address 2, the data A to be copied are prevented from being updated even when a write command designating the copy destination address 2 is received while the allocation information is being copied.

(S11) The storage apparatus 1 sends an allocation copy request, which is a request to copy the allocation information from the copy source address 1 to a copy destination address 2 of the SVOL 111B, to the storage apparatus 2.

(S12) The storage apparatus 2 that has received the allocation copy request determines whether the data attribute of the data area 113B is "common" or not. If the determined result is false, i.e., if the data attribute is "individual," then the storage apparatus 2 returns an error to the storage apparatus 1. The storage apparatus 1 resumes the sequence again from (S2). The storage apparatus 1 may resume the sequence from (S1) after returning an error to the host computer 13. Providing the storage apparatus 2 has received a write command designating the copy source address 1 of the SVOL after (S5), for example, the storage apparatus 2 changes the data attribute of the data area 113B to "individual" if the data attribute has been other than "individual," e.g., it has been "common." In this case, the determined result in (S12) is false.

(S13) If the determined result in (S12) is true, then the storage apparatus 2 copies allocation information from the copy source address 1 to the copy destination address 2 of the SVOL 111B, i.e., adds the copy destination address 2 as an allocation destination of the data area 113B. Thus, it is possible to read the data A via the copy destination address 2.

(S14) The storage apparatus 2 returns an allocation information copy completion response to the storage apparatus 1.

(S15) In response to the allocation information copy completion response, the storage apparatus 1 cancels the exclusivity of the slot indicated by the copy destination address 2 of the PVOL 111A. The address 2 as well as the address 1 now becomes an updatable address for the host computer 13.

(S16) The storage apparatus 1 returns an XCOPY command completion response to the host computer 13 via the network 14.

The sequence described above is an example of the XCOPY process.

<Storage Apparatus>

Figure 2:
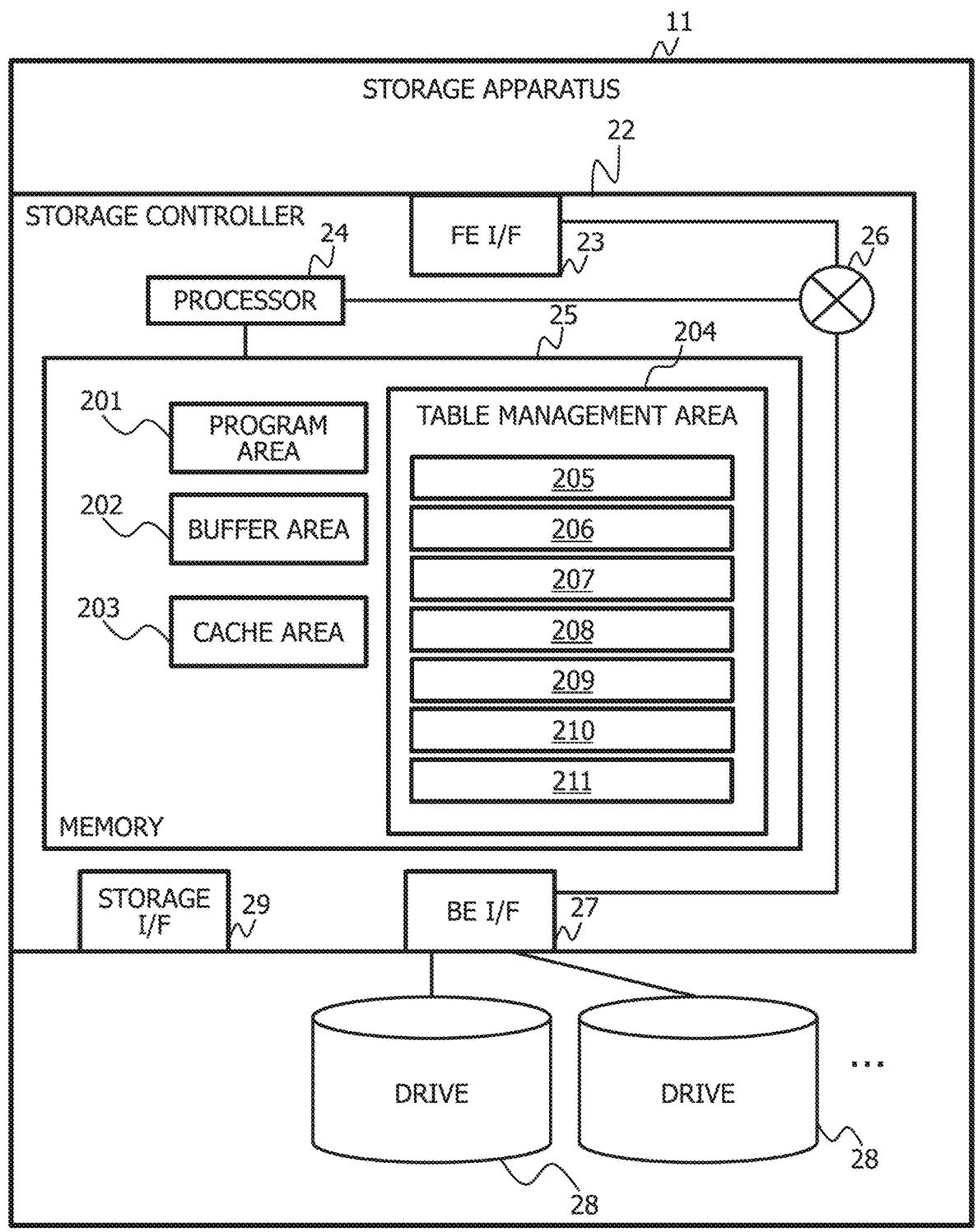
FIG. 2 is a diagram illustrating the configuration of a storage apparatus.

FIG. 2 is a diagram illustrating the configuration of a storage apparatus 11.

The storage apparatus 11 has one or more storage controllers 22 and a plurality of drives 28 connected to the one or more storage controllers 22.

The or each storage controller 22 includes an FE I/F (Front-End InterFace device) 23 for performing communication with the host computer 13, a storage I/F (InterFace device) 29 for performing communication with other storage apparatus, a processor 24 for controlling the storage apparatus 11 in its entirety, a memory 25 for storing programs and information used by the processor 24, a BE I/F (Back-End InterFace device) 27 for performing communication with the drives 28, and an internal network 26 that interconnects the components of the storage controller 22. The memory 25 has a program area 201 for managing the programs, a buffer area 202 as a temporary storage area for temporarily storing data at the time they are transferred and copied, a cache area 203 for temporarily storing write data from the host computer 13, i.e., data written in response to a write command from the host computer 13 and read data from the drives 28, i.e., data from the drives 28 in response to a read command from the host computer 13, and a table management area 204 that stores various tables. The table management area 204 stores a VOL management table 205 that holds information regarding VOLs, a pool configuration management table 206 that holds information regarding pools, a RAID configuration management table 207 that holds information regarding a RAID configuration, a pool allocation management table 208 that holds information regarding pool allocations, a drive allocation management table 209 that holds information regarding drive allocations, an actual drive allocation management table 210 that holds information regarding actual drive allocations, and an HA pair management table 211 that holds information regarding HA pairs.

Each of the drives 28 may be an SSD (Solid State Drive) or an HDD (Hard Disk Drive) or an FMD (Flash Module Device) 31 (see FIG. 3) to be described later. The drives 28 may be divided into a plurality of RAID groups, also referred to as parity groups. Each of the RAID groups includes one or more drives 28.

According to an HA pair configuration, the storage apparatus 1 is connected through the storage I/F 29 to another storage apparatus, e.g., the storage apparatus 2. An FC (Fiber Channel) network, e.g., SAN, or an IP (Internet Protocol) network, e.g., a LAN, may be connected to the storage I/F 29.

The FE I/F 23, the BE I/F 27, and storage I/F 29 are examples of the interface unit. The memory 25 is an example of the memory unit. The processor 24 is an example of the processor unit.

<Flash Module>

Figure 3:
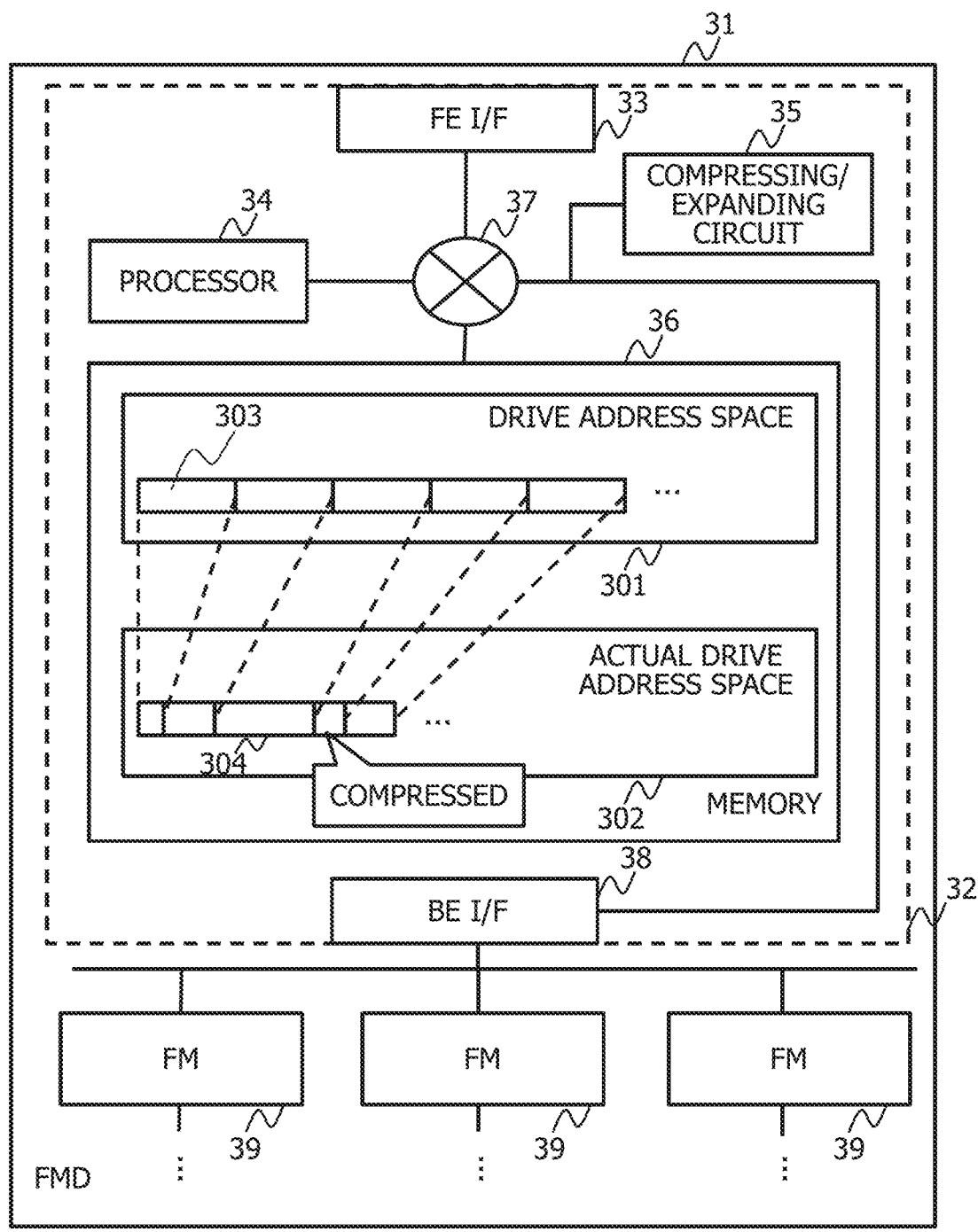
FIG. 3 is a diagram illustrating the configuration of an FMD (Flash Module Device).

FIG. 3 is a diagram illustrating the configuration of the FMD 31.

The FMD 31 has one or more FMD controllers 32 and one or more FMs (Flash Memories) 39 connected to the one or more FMD controllers 32.

The or each FMD controller 32 has an FE I/F 33 for performing communication with the storage controller 22, a processor 34 for controlling the inputting of data to and the outputting of data from the FMs, a compressing/expanding circuit 35 for compressing and expanding data, a memory 36 for storing data management information, and a BE I/F 38 for performing communication with the FMs 39.

Each of the FMs 39 includes one or more FM chips. Each of the FM chips has a plurality of physical areas. Specifically, each of the FM chips is a NAND flash and is made up of a plurality of physical blocks.

The or each FMD controller 32 provides a drive address space 301 that is a virtual address space to a host system, i.e., the storage controller 22. The or each FMD controller 32 manages correspondence between allocation management information 303 in the drive address space 301 and allocation management information 304 in an actual drive address space 302 that manages physical areas. For example, the or each FMD controller 32 manages allocation information whose data size has been changed by the compressing/expanding circuit 35. The or each FMD controller 32 specifies a physical area indicated by the allocation management information 304 in the actual drive address space 302 that corresponds to the allocation management information 303 in the drive address space 301 that is designated by an I/O, or read/write, command from the host system, i.e., the storage controller 22, and performs an I/O process on the specified physical area. The allocation management information 303 represents an LBA (Logical Block Address), for example, whereas the allocation management information 304 represents a PBA (Physical Block Address), for example. In other words, the or each FMD controller 32 performs address translation between a logical address or LBA and a physical address or PBA.

<VOL Management Table>

FIG. 4 is a diagram illustrating a configurational example of the VOL management table 205.

The VOL management table 205 has an entry for each VOL. Each entry stores information representing a VOL ID 41, a VOL attribute 42, an allocation copy flag 43, a VOL capacity 44, and a pool ID 45. One VOL, i.e., a "target VOL" in a description of FIG. 4, will be described as an example below.

The VOL ID 41 indicates the ID of the target VOL. The VOL attribute 42 indicates the attribute of the target VOL. The allocation copy flag 43 indicates whether there is an allocation copy function or not, i.e., whether allocation information can be copied or not. The VOL capacity 44 indicates the capacity of the target VOL. The pool ID 45 indicates the ID of a pool related to the target VOL.

In an XCOPY process, the processor 24 determines whether an allocation information copy process that does not require data transfer can be carried out or not by referring to the allocation copy flag 43 in the VOL management table 205. If the allocation copy flag 43 is "YES," then the processor 24 selects an allocation information copy process. Since both a data copy source VOL and a data copy destination VOL require an allocation copy function, it is necessary for the processor 24 to determine whether an allocation information copy process can be carried out or not with respect to each of the data copy source VOL and the data copy destination VOL.

<Pool Configuration Management Table>

FIG. 5 is a diagram illustrating a configurational example of the pool configuration management table 206.

A pool is a logical storage area configured based on one or more RAID groups. The pool configuration management table 206 has an entry for each pool. Each entry stores information representing a pool ID 51, a RAID group ID 52, a pool capacity 53, and a pool usage capacity 54. One pool, i.e., a "target pool" in a description of FIG. 5, will be described as an example below.

The pool ID 51 indicates the ID of the target pool. The RAID group ID 52 indicates the ID of each of one or more RAID groups as a basis for the target pool. The pool capacity 53 indicates the capacity of the target pool. The pool usage capacity 54 indicates the sum of areas allocated to a VOL in the pool capacity of the target pool.

FIG. 6 is a diagram illustrating a configurational example of the RAID configuration management table 207.

The RAID configuration management table 207 has an entry for each RAID group. Each entry stores information representing a RAID group ID 61, a drive ID 62, a drive type 63, a capacity 64, and a used capacity 65. One RAID group, i.e., a "target RAID group" in a description of FIG. 6, will be described as an example below.

The RAID group ID 61 indicates the ID of the target RAID group. The drive ID 62 indicates the ID of each of one or more drives making up the target RAID group. The drive type 63 indicates the type of one or more drives making up the target RAID group. The capacity 64 indicates the capacity of the target RAID group. The used capacity 65 indicates the capacity that is used among the capacities of the target RAID group.

<Allocation Management Table>

FIG. 7 is a diagram illustrating a configurational example of the pool allocation management table 208.

The pool allocation management table 208 has an entry for each VOL address, i.e., an address representing a slot. Each entry stores information representing a VOL ID 71, a VOL address 72, a pool ID 73, a pool address 74, and a data attribute 75. One VOL address, i.e., a "target VOL address" in a description of FIG. 7, will be described as an example below.

The VOL ID 71 indicates the ID of a VOL to which the target VOL address belongs. The VOL address 72 indicates the target VOL address. The pool ID 73 indicates the ID of a pool including a data area allocated to the target VOL address. The pool address 74 indicates the address of the data area allocated to the target VOL address, i.e., the address to which the pool belongs. The data attribute 75 indicates the data attribute of the data area allocated to the target VOL address.

FIG. 8 is a diagram illustrating a configurational example of the drive allocation management table 209.

The drive allocation management table 209 has an entry for each pool address. Each entry stores information representing a pool ID 81, a pool address 82, a RAID group ID 83, a drive ID 84, and a drive address 85. One pool address, i.e., a "target pool address" in a description of FIG. 8, will be described as an example below.

The pool ID 81 indicates the ID of a pool to which the target pool address belongs. The pool address 82 indicates the target pool address. The RAID group ID 83 indicates the ID of a RAID group as a basis for the data area represented by the target pool address. The drive ID 84 indicates the ID of a drive as a basis for the data area represented by the target pool address. The drive address 85 is a drive address corresponding to the target pool address, for example, an address, e.g., LBA, belonging to the drive address space 301.

FIG. 9 is a diagram illustrating a configurational example of the actual drive allocation management table 210.

The actual drive allocation management table 210 has an entry for each drive address. Each entry stores information representing a drive ID 91, a drive address 92, a pre-compression size 93, an actual drive ID 94, an actual drive address 95, a post-compression size 96, and a compression ratio 97. One drive address, i.e., a "target drive address" in a description of FIG. 9, will be described as an example below.

The drive ID 91 indicates the ID of the drive 28 to which the target drive address belongs. The drive address 92 indicates the target drive address. The pre-compression size 93 indicates the size of data, prior to being compressed, according to a write command designating the target drive address. The actual drive ID 94 indicates the ID of a recording medium, e.g., an FM, in the drive 28 to which the target drive address belongs. The actual drive address 95 indicates an actual drive address, e.g., an address belonging to the actual drive address space 302, allocated to the target drive address. The post-compression size 96 indicates the size of data, after being compressed, according to a write command designating the target drive address. The compression ratio 97 refers to the value of the post-compression size 96/the pre-compression size 93.

<Logical Storage Hierarchy>

Figure 10:
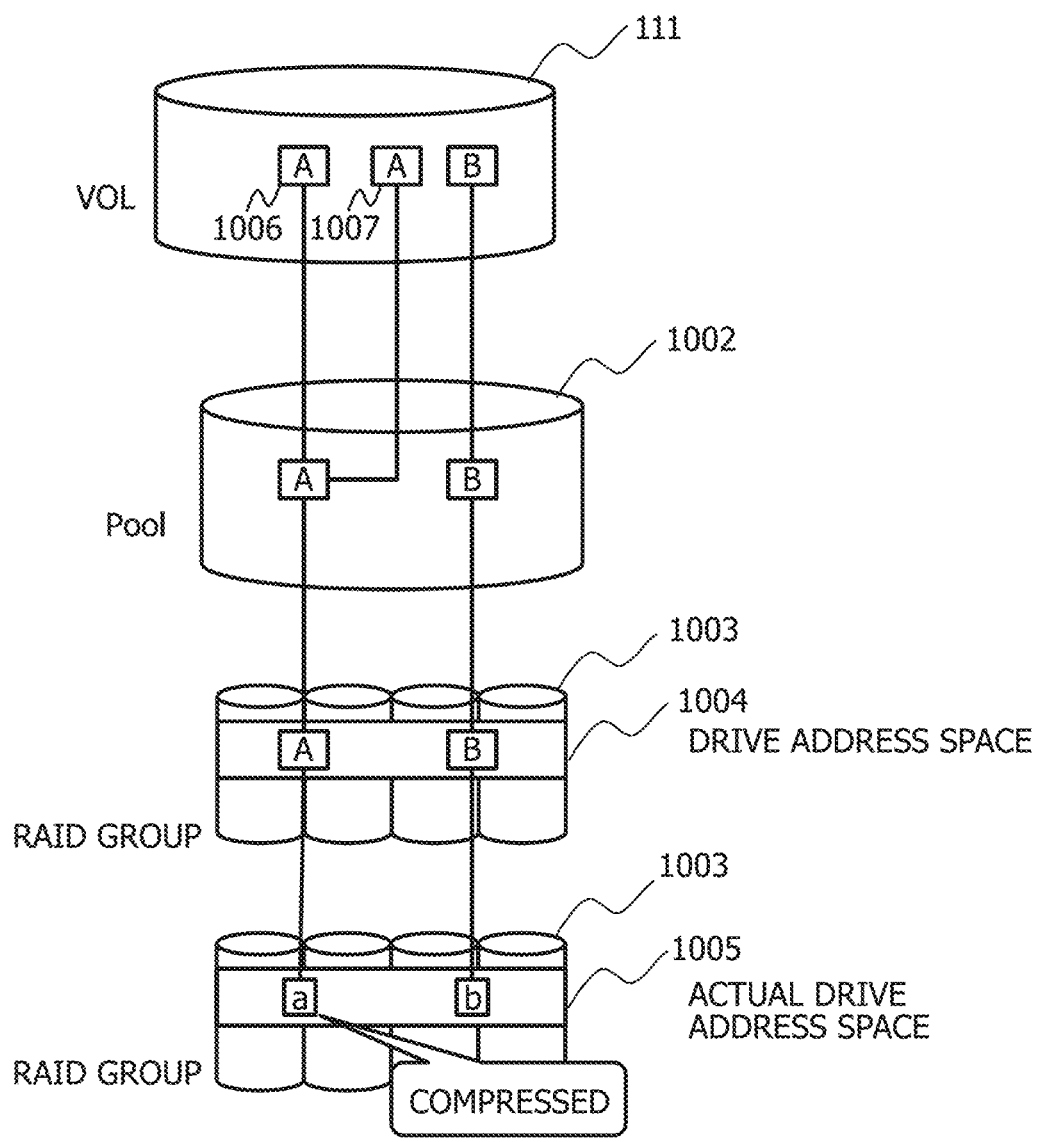
FIG. 10 is a diagram illustrating a configurational example of logic storage hierarchy.

FIG. 10 is a diagram illustrating a configurational example of logic storage hierarchy.

A VOL 111 is provided to the host computer 13. The VOL 111 may have a plurality of slots in a VOL or a plurality of VOLs designating one pool address depending on a copy process or a deduplication process. In the example illustrated in FIG. 10, two different slots or VOL addresses 1006 and 1007 designate one pool address. The allocation from the VOL 111 to a pool 1002 is managed based on the pool allocation management table 208. The allocation from the pool 1002 to a drive address space 1004, e.g., a plurality of drive address spaces provided by a plurality of drives that make up a RAID group 1003, is controlled based on the drive allocation management table 209.

If a drive with no compression function is employed, then the drive address space 1004 serves as a data storage destination. If an FMD as illustrated in FIG. 3 is employed, then an actual drive address space 1005 exists at a level lower than the drive address space 1004. For example, data a that are generated by compressing data A are stored in the actual drive address space 1005.

<HA Pair Management>

Figures 11, 12:
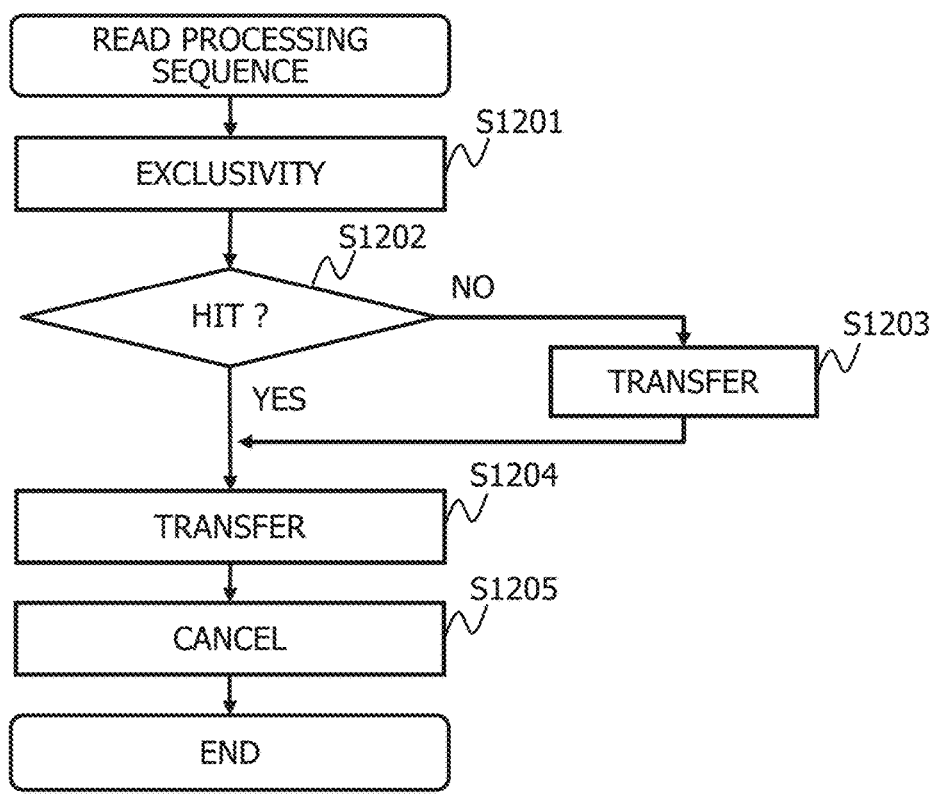
FIG. 11 is a diagram illustrating a configurational example of a management table for HA pair configurations.
FIG. 12 is a flowchart illustrating a read processing sequence.

FIG. 11 is a diagram illustrating a configurational example of the HA pair management table 211.

The HA pair management table 211 has an entry for each VOL. Each entry stores information representing a storage controller ID 1101, a VOL ID 1102, an HA pair attribute 1103, a companion ID 1104, and a virtual ID 1105. One VOL, i.e., a "target VOL" in a description of FIG. 11, will be described as an example below.

The storage controller ID 1101 indicates the ID of the storage controller 22 in the storage apparatus that has the target VOL. The VOL ID 1102 indicates the ID of the target VOL. The HA pair attribute 1103 indicates the attribute of the target VOL. If the target VOL makes up an HA pair, then the HA pair attribute 1103 represents a "PVOL" or an "SVOL." If the target VOL does not make up an HA pair, then the HA pair attribute 1103 represents "none." The companion ID 1104 indicates the ID of the storage controller 22 in the storage apparatus that has a VOL making up an HA pair with the target VOL. The companion ID 1104 may include the ID of the VOL of the companion of the HA pair. The virtual ID 1105 is a virtual ID to which the target VOL belongs.

An example of processing sequence carried out according to the present embodiment will hereinafter be described below.

<Read Processing Sequence>

FIG. 12 is a flowchart illustrating a read processing sequence. The read processing sequence starts when the storage apparatus 11 receives a read command from the host computer 13 via the network 14. According to the read command, a virtual ID, e.g., a virtual VOL ID, an address, and a data size, for example, are designated. The virtual ID is the ID of the PVOL for the storage apparatus 1 and the ID of the SVOL for the storage apparatus 2.

In S1201, the processor 24 retains exclusivity of the slot indicated by the read command. If another processing sequence has retained exclusivity of the slot when the processor 24 is to retain exclusivity of the slot, then the processor 24 carries out S1201 after elapse of a certain time.

In S1202, the processor 24 determines whether read data exist in the cache area 203 or not. If the determined result in S1202 is true, then control goes to S1204. If the determined result in S1202 is false, then the processor 24 transfers read data from a RAID group to the cache area 203 in S1203. At this time, the processor 24 identifies a pool ID 73 and a pool address 74 in the pool allocation management table 208 from the VOL ID and the VOL address designated by the host computer 13, and refers to a drive ID 84 and a drive address 85 from the drive allocation management table 209. Finally, the processor 24 refers to an actual drive ID 94 and an actual drive address 95 from the actual drive allocation management table 210, identifying a storage location of the data. The data transferred from the actual drive address exists in the cache area 203 until rewritten again to the drive. If the data are read again, control skips S1203.

In S1204, the processor 24 transfers the read data in the cache area 203 to the host computer 13. The host computer 13 recognizes that the read processing sequence is finished at the time of completion of the data transfer in S1204.

Thereafter, the processor 24 cancels the retained exclusivity of the slot in S1205.

<Write Processing Sequence>

Figure 13:
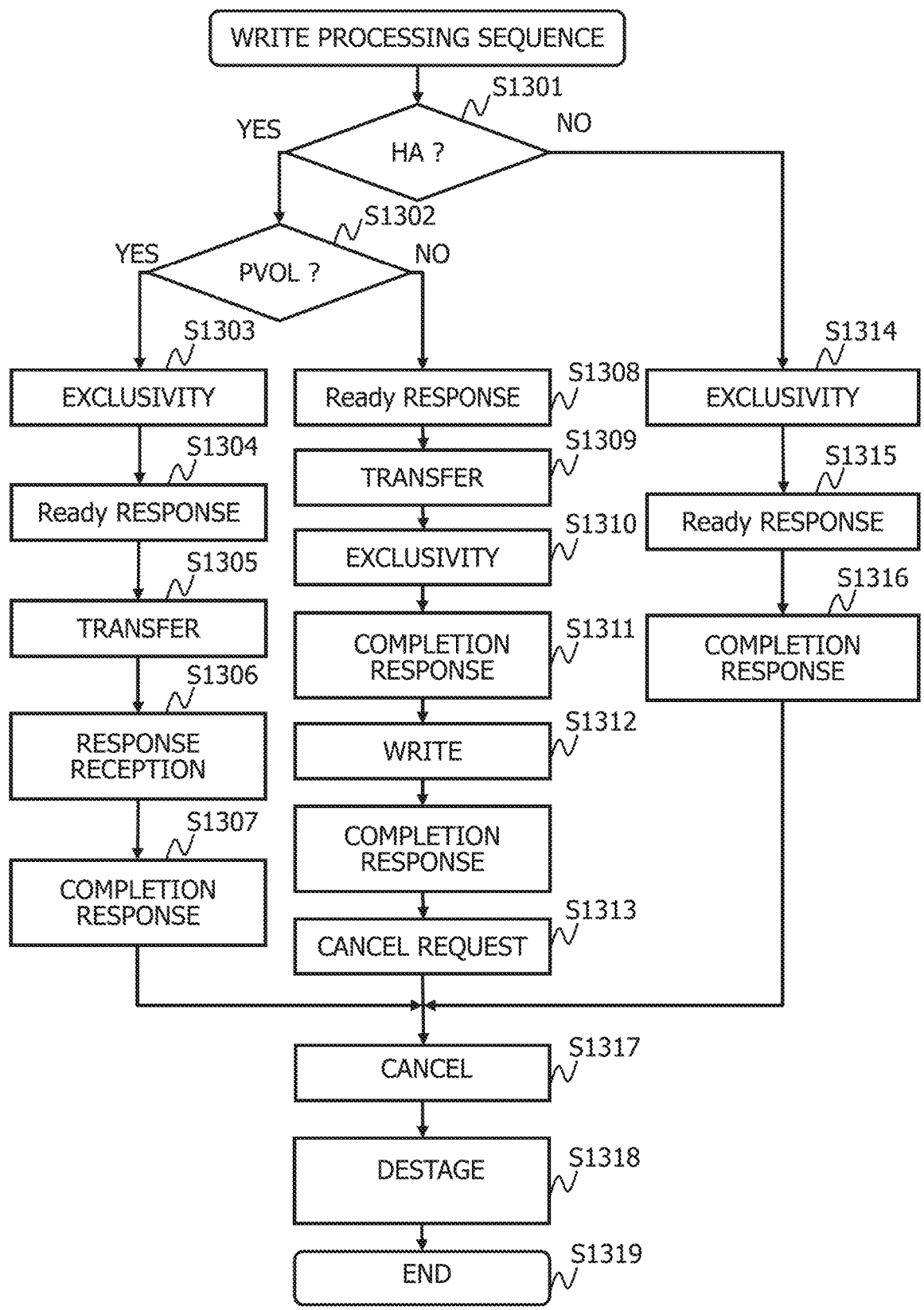
FIG. 13 is a flowchart illustrating a write processing sequence.

FIG. 13 is a flowchart illustrating a write processing sequence. The write processing sequence starts when the storage apparatus 11 receives a write command from the host computer 13. The write command that is received may be any of those in the cases described below. In the description that follows, it is assumed that the storage apparatus 1 receives a write command. Further, in the description that follows, the reference numerals denoting the components of the storage apparatus 1 are combined with a suffix "A." For example, the processor 24 of the storage apparatus 1 is referred to as "processor 24A." The reference numerals denoting the components of the storage apparatus 2 are combined with a suffix "B." For example, the processor 24 of the storage apparatus 2 is referred to as "processor 24B."

Case 1: a write command for a VOL that is not of an HA pair configuration.

Case 2: a write command for the PVOL 111A that is of an HA pair configuration, i.e., a write command for the storage apparatus 1, designating a virtual ID to which the PVOL 111A belongs.

Case 3: a write command for the SVOL 111B that is of an HA pair configuration, i.e., a write command for the storage apparatus 2, designating a virtual ID to which the SVOL 111B belongs.

<Case 1>

According to the received write command, a VOL whose HA pair attribute 1103A is "none" is designated in the HA pair management table 211A of the storage apparatus 1. In S1301, the processor 24A refers to the HA pair management table 211A and determines whether the write destination VOL makes up an HA pair configuration or not, i.e., whether the HA pair attribute 1103A represents either one of "PVOL" and "SVOL" or not. In Case 1, the determined result of S1301 is false. Therefore, the processor 24A retains exclusivity of a slot indicated by the address designated by the host computer 13 in S1314. Concurrent with retaining the exclusivity of the slot, the processor 24A assigns a CM slot, i.e., an area of the CM area 203A, as a data write destination. In S1315, the processor 24A sends a response "Ready" indicating that it is ready for the write processing sequence to the host computer 13. The processor 24A receives write data from the host computer 13 that has received the response "Ready." Thereafter, in S1316, the processor 24A returns a write completion response to the host computer 13. At this time, on the assumption that the writing of the data in the CM area 203A is completed, the host computer 13 regards the write processing sequence as being completed. Thereafter, the processor 24A cancels the exclusivity of the slot that has been retained in S1317. In S1318, the processor 24A writes or destages the data stored in the CM area 203A to the drive 28A. With respect to the writing of the data to the drive 28A, the processor 24A allocates a pool, a drive, and an actual drive, and registers allocation information in each of the pool allocation management table 208A, the drive allocation management table 209A, and the actual drive allocation management table 210A. The writing of the data may not necessarily be carried out as it is asynchronous with the write processing sequence.

<Case 2>

Based on the received write command, the HA pair attribute 1103A is determined as representing the VOL of the "PVOL," i.e., the PVOL 111A. The determined result of S1301 is true. In S1302, the processor 24A determines whether the VOL as a write destination is PVOL or not. The determined result of S1302 is true. In S1303, the processor 24A retains exclusivity of a slot indicated by the address designated by the host computer 13. In S1304, the processor 24A sends a response "Ready" to the host computer 13. The processor 24A receives write data from the host computer 13 that has received the response "Ready." Thereafter, in S1305, the processor 24A transfers the write command and write data to the SVOL 111B, i.e., the storage apparatus 2 having the SVOL 111B, that makes up an HA pair with the PVOL 111A. In S1306, the processor 24B of the storage apparatus 2 temporarily stores the write data in the buffer area 202B and retains a CM slot from the CM area 203B, after which the processor 24B transfers the write data to the CM slot, i.e., the CM area 203B. Upon completion of the data transfer, the processor 24B returns a completion response to the storage apparatus 1. In response to the completion response, the processor 24A of the storage apparatus 1 returns a write completion response to the host computer 13. Thereafter, in S1317, the processor 24A cancels the exclusivity of the slot that has been retained. In S1318, the processors 24A and 24B write the data stored in the CM areas 203A and 203B to the drives 28A and 28B. As with Case 1, with respect to the writing of the data to the drive 28A, the processors 24A and 24B allocate pools, drives, and actual drives, and register allocation information in each of the pool allocation management tables 208A and 208B, the drive allocation management tables 209A and 209B, and the actual drive allocation management tables 210A and 210B. With the HA pair configuration, the data are written to the drives in the PVOL 111A and the SVOL 111B. The writing of the data may not necessarily be carried out as it is asynchronous with the write processing sequence.

<Case 3>

Based on the received write command, the HA pair attribute 1103B is determined as representing the VOL of the "SVOL," i.e., the SVOL 111B. The determined result of S1301 is true. The determined result of S1302 is false. In S1308, the processor 24B of the storage apparatus 2 sends a response "Ready." The processor 24B receives write data from the host computer 13 that has received the response "Ready." The processor 24 temporarily stores the write data in the buffer area 202B. In S1309, the processor 24B transfers the write command and write data to the PVOL 111A, i.e., the storage apparatus 1 having the PVOL 111A, that makes up an HA pair with the SVOL 111B. The processor 24A of the storage apparatus 1 stores the transferred write data in the buffer area 202A. In S1310, the processor 24A retains exclusivity of a slot indicated by the VOL address designated by the write command. Concurrent with retaining the exclusivity of the slot, the processor 24A retains a CM slot, i.e., an area of the CM area 203A. In S1311, the processor 24A transfers the data from the buffer area 202A to the CM slot. After having transferred the data, the processor 24A returns a completion response to the storage apparatus 2. In S1312, the processor 24B retains the CM slot, i.e., an area of the CM area 203B, and transfers the data from the buffer areas 202B to the CM slot. After having transferred the data, the processor 24B returns a completion response with respect to the write processing sequence to the host computer 13. At this time, the host computer regards the write processing sequence as being completed. Thereafter, the processor 24B sends a request to cancel the exclusivity of the write destination slot to the storage apparatus 1 in S1313. In S1317, the processor 24A cancels the exclusivity of the retained slot in response to the request. In S1318, the processors 24B and 24A write the data in the CM areas 203B and 203A to the drives 28B and 28A. As with Cases 1 and 2, with respect to the writing of the data to the drives 28B and 28A, the processors 24B and 24A allocate pools, drives, and actual drives, and register allocation information in each of the pool allocation management tables 208B and 208A, the drive allocation management tables 209B and 209A, and the actual drive allocation management tables 210B and 210A. With the HA pair configuration, the data are written to the drives in the PVOL 111A and the SVOL 111B, as with Case 2. The writing of the data may not necessarily be carried out as it is asynchronous with the write processing sequence.

<Offloaded Data Copy Processing Sequence>

Figure 14:
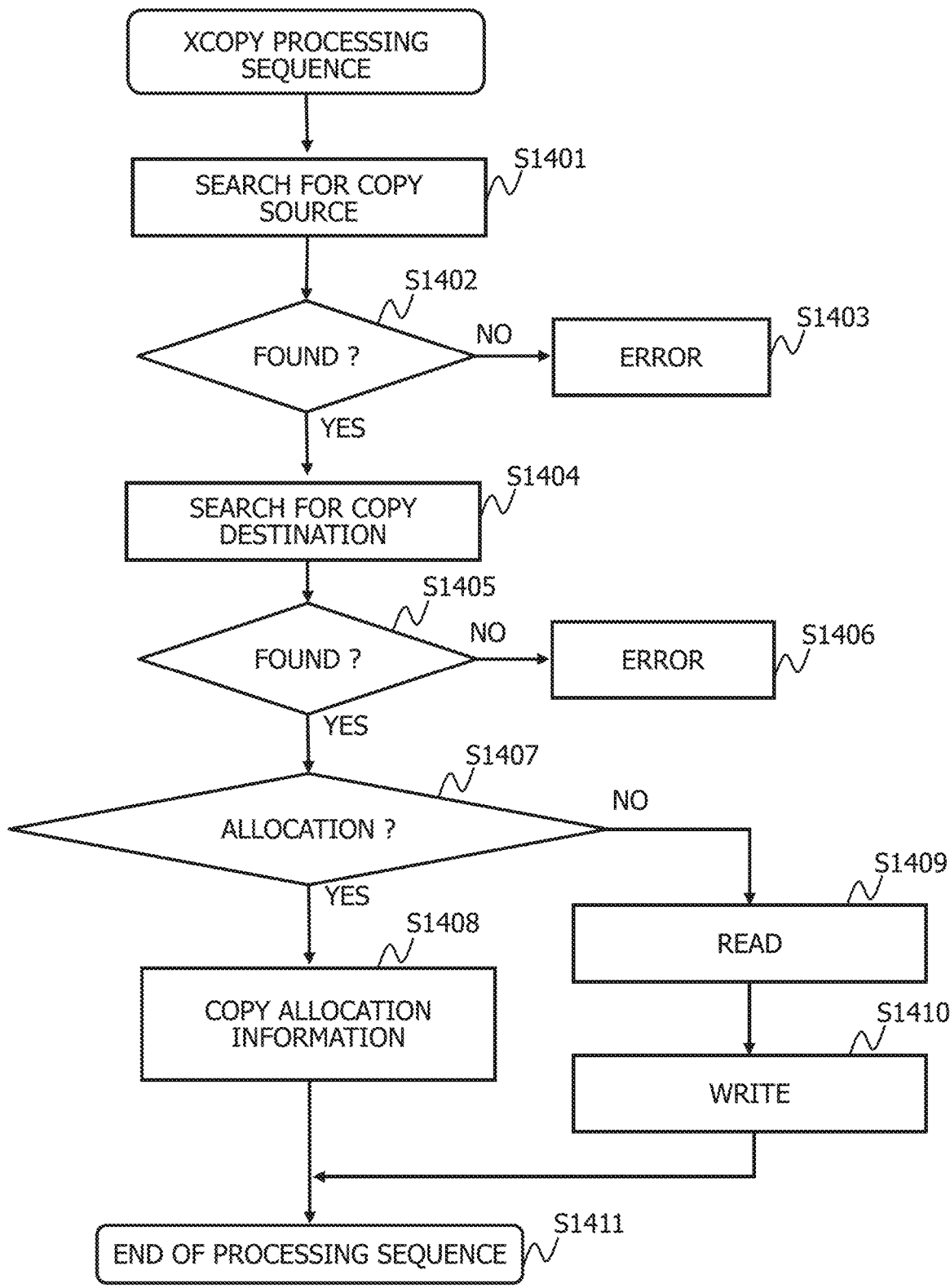
FIG. 14 is a flowchart illustrating an XCOPY processing sequence.

FIG. 14 is a flowchart illustrating an XCOPY processing sequence. An XCOPY command that is received may be any of those in the cases described below.

Case 1: an XCOPY command that designates copying from a PVOL to the same PVOL.

Case 2: an XCOPY command that designates copying from a PVOL to another PVOL.

Case 3: an XCOPY command that designates copying from an SVOL to the same SVOL.

Case 4: an XCOPY command that designates copying from an SVOL to another SVOL.

Case 5: an XCOPY command that designates copying to a VOL with no allocation copy function.

Case 6: an XCOPY command that designates copying from a PVOL to an SVOL.

Case 7: an XCOPY command that designates copying from an SVOL to a PVOL;

Case 8: an XCOPY command that designates copying from a PVOL to a VOL of a configuration other than an HA pair configuration.

Case 9: an XCOPY command that designates copying from an SVOL to a VOL of a configuration other than an HA pair configuration.

Case 10: an XCOPY command that designates copying a VOL of a configuration other than an HA pair configuration to a PVOL.

Case 11: an XCOPY command that designates copying a VOL of a configuration other than an HA pair configuration to an SVOL.

<Case 1 and Case 2>

The storage apparatus 1 receives an XCOPY command from the host computer 13. In the XCOPY command, there are designated copy source VOL information, i.e., a VOL ID and a VOL address, and copy destination VOL information, i.e., a VOL ID and a VOL address.

In S1401, the processor 24A refers to the VOL management table 205A and the HA pair management table 211A and searches for a copy source VOL. If no copy source VOL is found (S1402: NO), then the processor 24A returns an error to the host computer 13 in S1403.

If a copy source VOL is found (S1402: YES), then the Processor 24A refers to the VOL management table 205A and the HA pair management table 211A and searches for a copy destination VOL in S1404. If no copy destination VOL is found (S1405: NO), then the processor 24A returns an error to the host computer 13.

If a copy destination VOL is found (S1405: YES), then the processor 24A determines in S1407 whether the allocation copy flag 43A is "YES" or not for both the copy source VOL and the copy destination VOL. In Case 1 and Case 2, the determined result of S1407 is true. In S1408, the processor 24A performs an allocation information copy processing sequence (FIG. 15) for copying allocation information from the copy source VOL to the copy destination VOL.

Figure 15:
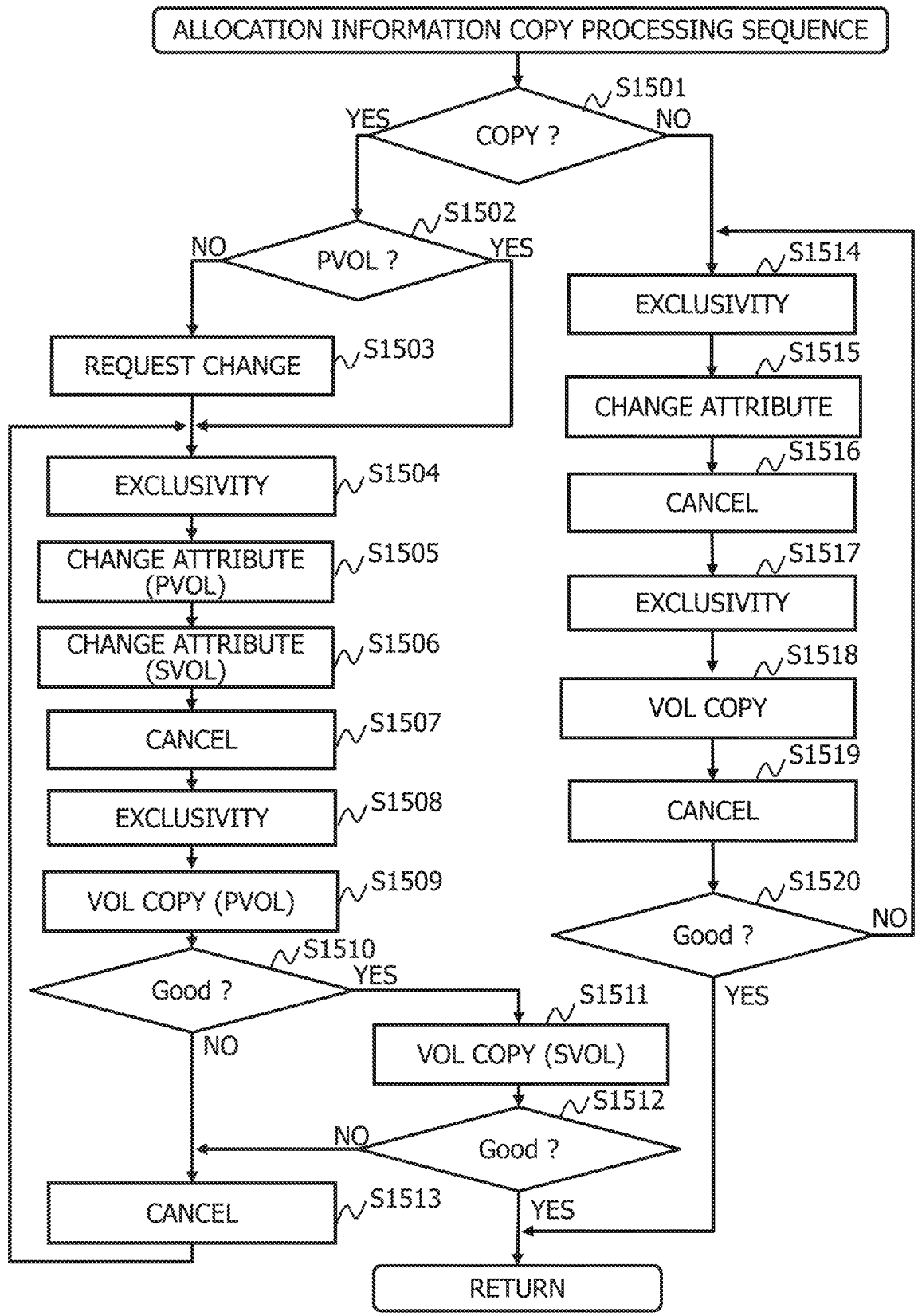
FIG. 15 is a flowchart illustrating an allocation information copy processing sequence.
Figure 16:
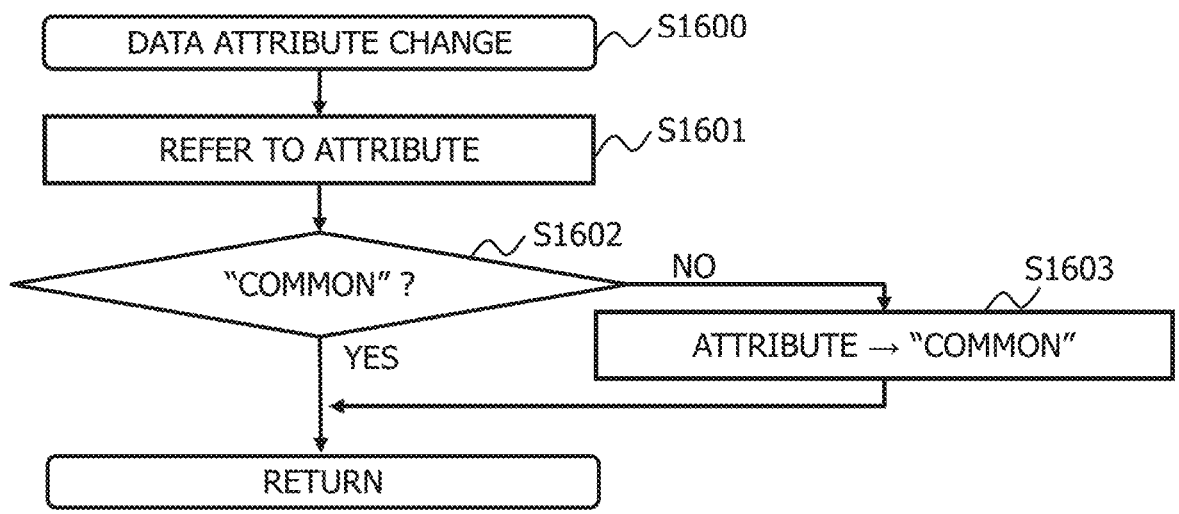
FIG. 16 is a flowchart illustrating a data attribute change processing sequence.

As illustrated in FIG. 15, the processor 24A determines whether the processing sequence is a copy processing sequence between PVOLs or SVOLs in S1501. For the determining process in S1501, the processor 24A refers to the HA pair management table 211A and identifies an HA pair attribute 1103 from the VOL ID 1102. If both the copy source VOL and the copy destination VOL are PVOLs (S1501: YES and S1502: YES), then the processor 24A retains exclusivity of a slot in the copy source PVOL, i.e., a slot indicated by the VOL address designated by the host computer 13, in S1504. In S1505, the processor 24A performs a data attribute change processing sequence (FIG. 16) for changing a data attribute of copy source data corresponding to the VOL address, i.e., a data area allocated to the VOL address. Specifically, as illustrated in FIG. 16, the processor 24A refers to a data attribute 75A corresponding to the copy source VOL address in the pool allocation management table 208A in S1601. If the data attribute 75A referred to represents "individual" (S1602: NO), then the processor 24A changes the data attribute 75A to "common" in S1603.

Thereafter, in S1506 illustrated in FIG. 15, the processor 24A sends a data attribute change request to the storage apparatus 2 that has an SVOL making up an HA pair with the copy source PVOL to change the data attribute of copy source data. In response to the request, the processor 24B of the storage apparatus 2 performs a data attribute change processing sequence for changing a data attribute of copy source data corresponding to the copy source VOL address with respect to the SVOL. Specifically, as illustrated in FIG. 16, the processor 24B refers to a data attribute 75B corresponding to the copy source VOL address in S1601. If the data attribute 75B represents "individual" (S1602: NO), then the processor 24B changes the data attribute 75B to "common." When the data attribute change processing sequence is ended, the processor 24B returns a completion response to the storage apparatus 1. In response to the completion response, the processor 24A of the storage apparatus 1 cancels the retained exclusivity of the slot in S1507 illustrated in FIG. 15. In S1508, the processor 24A retains exclusivity of a slot indicated by the copy destination VOL address. In S1509, the processor 24A performs a VOL copy processing sequence which is a copy processing sequence for copying the allocation information relative to the PVOL.

Figure 17:
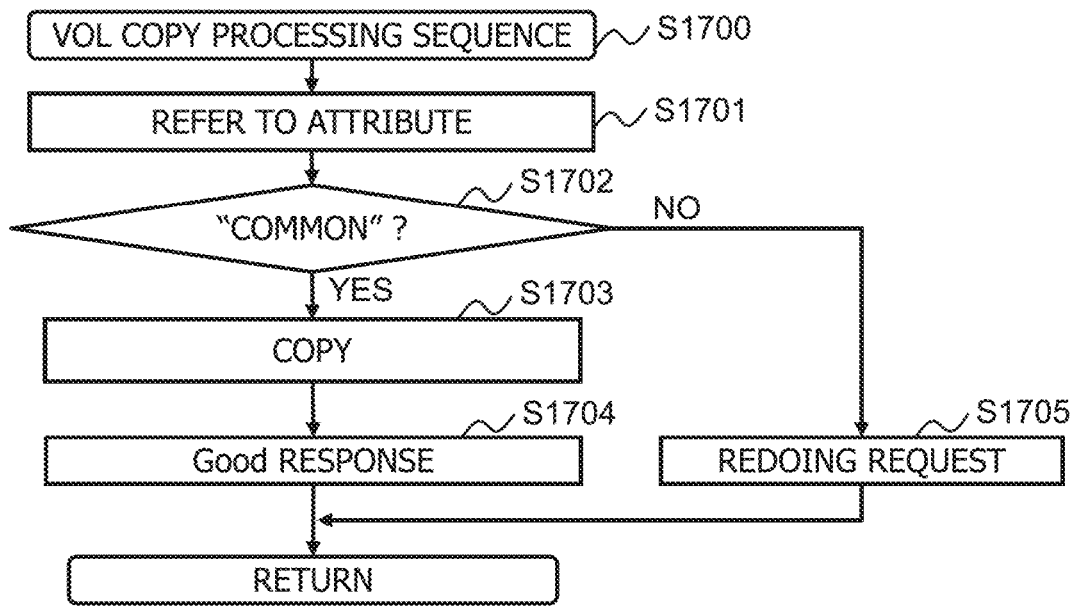
FIG. 17 is a flowchart illustrating a VOL copy processing sequence.

The VOL copy processing sequence is illustrated in FIG. 17. In S1701, the processor 24A refers again to the data attribute 75A corresponding to the copy source VOL address. If the data attribute 75A referred to has been changed to "individual" by an updating process of the host computer 13 (S1702: NO), then the processor 24A returns a redoing response for redoing the XCOPY processing sequence in S1705, regarding that a so-called passing-each-other is detected. If the data attribute 75A remains to be "common" (S1702: YES), then the processor 24A copies the allocation information allocated to the copy source VOL address to the copy destination VOL address in S1703. Specifically, the processor 24A registers the VOL ID 71 and the VOL address 72 of the copy destination VOL in an entry of the pool allocation management table 208A, and copies the pool ID 73, the pool address 74, and the data attribute 75 that correspond to the copy source VOL address to the entry. When the allocation information copy is completed, the processor 24A returns a Good response in S1704.

As illustrated in FIG. 15, if a Good response is returned from S1509 (S1510: YES), then the processor 24A requests the storage apparatus 2 to carry out a VOL copy processing sequence which is a copy processing sequence for copying the allocation information relative to the SVOL in S1511. In response to the request, the processor 24B performs a VOL copy processing sequence which is similar to the copy processing sequence with respect to the PVOL, i.e., the VOL copy processing sequence illustrated with reference to FIG. 17, on the SVOL. The processor 24B then returns a response representing the result of the VOL copy processing sequence to the storage apparatus 1.

As illustrated in FIG. 15, if a Good response is returned from S1511 (S1510: YES), then the allocation information copy processing sequence is ended. The processor 24A returns a completion of the XCOPY processing sequence to the host computer 13, whereupon the XCOPY processing sequence is ended (see FIG. 14).

If a redoing response is returned from S1509 or S1511 (S1510: NO or S1512: NO), then the processor 24A cancels the exclusivity of the copy destination slot in S1513. Thereafter, the processor 24A, for example, returns an error of the XCOPY processing sequence, i.e., a request for resending an XCOPY command, to the host computer 13.

The above processing sequence is an XCOPY processing sequence according to an XCOPY command for Case 1 and Case 2. Case 3 and subsequence Cases will described below mainly as to their differences from the XCOPY processing sequence in Case 1 and Case 2.

<Case 3 and Case 4>

Case 3 and Case 4 are different from Case 1 and Case 2 chiefly as follows:

The storage apparatus 2 receives an XCOPY command from the host computer 13.

From S1502: NO, the processor 24B sends a data attribute change request for changing the data attribute of a copy source address VOL to a PVOL that makes up an HA pair with the SVOL, i.e., the storage apparatus 1 having a PVOL in S1503. In response to the request, the processor 24A carries out the processing from S1504.

<Case 5>

The storage apparatus 1 or the storage apparatus 2 receives an XCOPY command from the host computer 13. It is assumed below that the storage apparatus 1 receives an XCOPY command. The determined result of S1407 is false. In S1409, the processor 24A reads copy target data from the copy source VOL address to the buffer area 202A. In S1410, the processor 24A writes the copy target data from the buffer area 202A to the copy destination VOL address.

<Case 6 to Case 11>

The storage apparatus 1 or the storage apparatus 2 receives an XCOPY command from the host computer 13. It is assumed below that the storage apparatus 1 receives an XCOPY command. An example in which the determined result of S1407 is true will be described. The determined result of S1501 is false (S1501: NO). The processor 24A retains exclusivity of a slot indicated by the copy source VOL address in S1514. In S1515, the processor 24A performs a data attribute change processing sequence for changing a data attribute of copy source data indicated by the copy source VOL address. The details of the data attribute change processing sequence in S1515 are illustrated in FIG. 16. Specifically, if the data attribute 75A of the copy source data represents "individual," then the processor 24A changes the data attribute 75A to "common." In S1516, the processor 24A cancels the retained exclusivity of the slot. In S1517, the processor 24A retains exclusivity of a slot with respect to the copy destination VOL address. In S1518, the processor 24A performs a VOL copy processing sequence for copying the allocation information. The details of the VOL copy processing sequence are illustrated in FIG. 17. Specifically, if the data attribute 75A remains to be "common," then the processor 24A copies the allocation information allocated to the copy source VOL address to the copy destination VOL address. In S1519, the processor 24A cancels the retained exclusivity of the slot with respect to the copy destination VOL address. In S1520, the processor 24A determines whether the VOL copy processing sequence has been completed normally or not, i.e., whether a Good response has been returned or not. If the determined result in S1520 is false (S1520: NO), then the processing returns to S1514. If the determined result in S1520 is true (S1520: YES), then the XCOPY processing sequence is ended.

As described above, the storage system 100 according to the present embodiment is highly reliable on account of an HA pair configuration that allows the system to keep operating in the event of a shutdown of the entire storage apparatus 11, while making it possible to perform an offloaded data copy process that realizes higher performance and resource utilization efficiency, such as reductions in data processing time and loads on the host computer 13.

Embodiment 2

Embodiment 2 will be described below. Differences with Embodiment 1 will mainly be described, whereas features that are shared by Embodiment 1 will be omitted or simplified.

According to Embodiment 2, the processor 24A simultaneously retains exclusivity of the copy source address 1 and the copy destination address 2 of the PVOL 111A, based on the fact that it is necessary to exclusively use slots of the PVOL 111A for an updating process for updating an HA pair configuration, i.e., the processor 24A retains exclusivity of both the copy source address 1 and the copy destination address 2 in (S2) illustrated in FIG. 1. The processor 24A also cancels the exclusivity of the slots after the allocation information has been copied. This function is owned by each storage apparatus other than the storage apparatus 1, as well as the storage apparatus 1.

The processor 24A may retain exclusivity of the copy destination address 2 prior to (S7) illustrated in FIG. 1, and may simultaneously cancel the exclusivity of both the copy source address 1 and the copy destination address 2.

The present invention is not limited to the embodiments described above, but may cover various modifications. The above embodiments have been illustrated in detail for the purpose of describing the invention for an easier understanding thereof, and the invention should not necessarily be restricted to those which include all the details described. Some of the components of a certain embodiment may be replaced with or may be added to those of another embodiment. Some of the components of each of the embodiments may be added to or replaced with other components, or may be deleted. Each of the above components, functions, processing sections, and processing means may be implemented partly or wholly by hardware in terms of integrated circuits, for example. Each of the above components, functions, etc. described above may be implemented by software in terms of programs that are interpreted and executed by processors to realize functions.

Information representing programs, tables, files, and so on that realize functions may be stored in a storage device such as a memory, an HDD, an SSD, an IC card, an SD card, or a DVD. The drawings illustrate control lines and information lines that are deemed necessary to describe the embodiments, and may not necessarily illustrate all control lines and information lines required in products. In reality, all the components may be considered to be connected to each other.

Each of the elements, e.g., a controller, can be identified by a number or the like. However, any of various pieces of identifying information such as a name or the like may be used as long as it can identify each of the elements. Those parts in the drawings and description of the embodiments which are identical are denoted by identical reference characters. The present invention is not limited to the embodiments, and all applications in conformity with the idea of the present invention are included in the technical scope of the invention. Unless specified otherwise, each of the components may be plural or singular.

Figure 18:
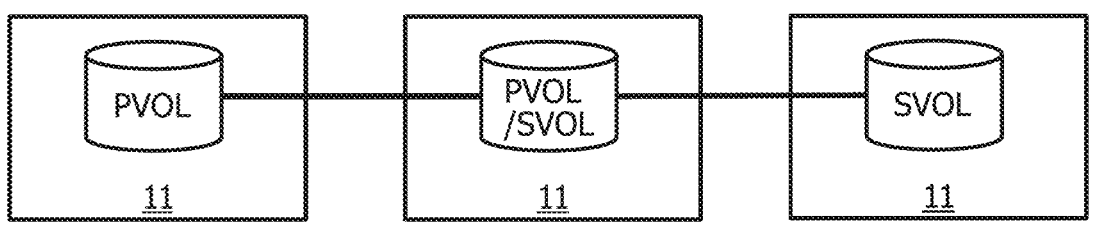
FIG. 18 illustrates an example of two or more HA pairs in cascade.

The present invention is also applicable to arrangements in which two or more HA pairs are connected in cascade as illustrated in FIG. 18. "SVOL/PVOL" means that an HA pair is made up of SVOLs and another HA pair is made up of PVOLs. The present invention is not limited to HA pairs, but may be applied to another type of VOL pair, i.e., a pair of PVOL and SVOL, where data can be written in an SVOL.

DESCRIPTION OF REFERENCE CHARACTERS

100: Storage system

The invention claimed is:

1. A storage system having a plurality of storage apparatuses connected to a host computer, wherein
    one of the plurality of storage apparatuses functions as a first storage apparatus having a primary volume, which is paired with a secondary volume;
    one of the plurality of storage apparatuses functions as a second storage apparatus having the secondary volume;
    each of the primary volume and the secondary volume is updatable;
    each of the first storage apparatus and the second storage apparatus, upon reception of a write command, changes a data attribute of a data area allocated to an address designated by the write command, to a first attribute if the data attribute is other than the first attribute; and
    in an offloaded data copy processing sequence performed when the first storage apparatus or the second storage apparatus receives an offloaded data copy command from the host computer, each of the first storage apparatus and the second storage apparatus
    (A) changes the data attribute of a data area allocated to a copy source address according to the offloaded data copy command, to a second attribute if the data attribute is other than the second attribute, and
    (B) when an allocation information copy process is to be performed to allocate the data area to a copy destination address according to the offloaded data copy command, performs the allocation information copy process if the data attribute of the data area is the second attribute, and
    discontinues the offloaded data copy processing sequence if the data attribute of the data area is the first attribute.

2. The storage system according to claim 1, wherein each of the first storage apparatus and the second storage apparatus receives a write command and, if exclusivity of an address designated by the write command is canceled, changes a data attribute of a data area allocated to the address to the first attribute if the data attribute is other than the first attribute; and
    in (A),
    (a1) the first storage apparatus retains exclusivity of the copy source address according to the offloaded data copy command with respect to the primary volume, and
    (a2) subsequently to (a1), the first storage apparatus changes the data attribute of the data area allocated to the copy source address whose exclusivity has been retained, to the second attribute if the data attribute is other than the second attribute with respect to the primary volume.

3. The storage system according to claim 2, wherein in (A),
    (a3) subsequently to (a2), the first storage apparatus sends a data attribute change request for changing the data attribute of the copy source address to the second storage apparatus, and
    (a4) the second storage apparatus, responsive to the data attribute change request, changes the data attribute of the data area allocated to the copy source address, to the second attribute if the data attribute is other than the second attribute with respect to the secondary volume.

4. The storage system according to claim 3, wherein in (A),
   (a5) subsequently to (a4), the second storage apparatus returns a completion response indicative of a completion of changing of the data attribute to the first storage apparatus, and
   (a6) the first storage apparatus, responsive to the completion response, retains exclusivity of the copy destination address according to the offloaded data copy command with respect to the primary volume; and
subsequently to (a6), the first storage apparatus performs (B).

5. The storage system according to claim 4, wherein in (a6), the first storage apparatus retains exclusivity of the copy destination address according to the offloaded data copy command after having canceled the exclusivity of the copy source address with respect to the primary volume.

6. The storage system according to claim 5, wherein the first storage apparatus cancels the exclusivity of the copy destination address with respect to the primary volume after (B) regarding each of the first storage apparatus and the second storage apparatus.

7. The storage system according to claim 2, wherein in (a1), the first storage apparatus retains exclusivity of both the copy source address and the copy destination address according to the offloaded data copy command with respect to the primary volume.

8. The storage system according to claim 7, wherein the first storage apparatus cancels the exclusivity of both the copy source address and the copy destination address with respect to the primary volume after (B) regarding each of the first storage apparatus and the second storage apparatus.

9. A storage control method for a storage system having a plurality of storage apparatuses connected to a host computer, wherein
   one of the plurality of storage apparatuses functions as a first storage apparatus having a primary volume, which is paired with a secondary volume;
   one of the plurality of storage apparatuses functions as a second storage apparatus having the secondary volume;
   each of the primary volume and the secondary volume is updatable;
   each of the first storage apparatus and the second storage apparatus, upon reception of a write command, changes a data attribute of a data area allocated to an address designated by the write command, to a first attribute if the data attribute is other than the first attribute; and
   in an offloaded data copy processing sequence performed when the first storage apparatus or the second storage apparatus receives an offloaded data copy command from the host computer, each of the first storage apparatus and the second storage apparatus (A) changes the data attribute of a data area allocated to a copy source address according to the offloaded data copy command, to a second attribute if the data attribute is other than the second attribute, and
(B) when an allocation information copy process is to be performed to allocate the data area to a copy destination address according to the offloaded data copy command,
   performs the allocation information copy process if the data attribute of the data area is the second attribute, and
   discontinues the offloaded data copy processing sequence if the data attribute of the data area is the first attribute.

10. A first storage apparatus as a storage apparatus having a primary volume which is paired with a secondary volume, comprising:
   a storage device unit including one or more storage devices as a basis for the primary volume;
   an interface unit including one or more interface devices wherein one of said one or more interface devices is connected to a second storage apparatus having the secondary volume;
   a memory unit including one or more memories for storing information representing data attributes of data areas; and
   a processor unit including one or more processors connected to the storage device unit, the interface unit, and the memory unit;
   wherein the processor unit, upon reception of a write command, changes a data attribute of a data area allocated to an address designated by the write command, to a first attribute if the data attribute is other than the first attribute; and
   in an offloaded data copy processing sequence performed when the first storage apparatus or the second storage apparatus receives an offloaded data copy command from a host computer, the processor unit
   changes said data attribute of said data area allocated to a copy source address according to the offloaded data copy command, to a second attribute if the data attribute is other than the second attribute,
   sends a data attribute change request for changing the data attribute of the copy source address to the second storage apparatus,
   receives a completion response indicative of a completion of changing of the data attribute from the second storage apparatus, and
   when an allocation information copy process is to be performed to allocate the data area to a copy destination address according to the offloaded data copy command,
   performs the allocation information copy process if the data attribute of the data area is the second attribute, and
   discontinues the offloaded data copy processing sequence if the data attribute of the data area is the first attribute.

* * * * *